(12) United States Patent
Jones

(10) Patent No.: US 9,150,435 B1
(45) Date of Patent: *Oct. 6, 2015

(54) METHOD OF STRIPPING VOLATILE ORGANIC COMPOUNDS FROM WATER USING A GAS SPARGED HYDROCYCLONE

(71) Applicant: John D. Jones, Phoenix, AZ (US)

(72) Inventor: John D. Jones, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/268,241

(22) Filed: May 2, 2014

Related U.S. Application Data

(60) Provisional application No. 61/902,261, filed on Nov. 10, 2013.

(51) Int. Cl.
| | | |
|---|---|---|
| B01D 19/00 | (2006.01) | |
| C02F 1/38 | (2006.01) | |
| C02F 1/24 | (2006.01) | |
| C02F 101/32 | (2006.01) | |
| B01D 19/04 | (2006.01) | |

(52) U.S. Cl.
CPC .............. C02F 1/38 (2013.01); B01D 19/0057 (2013.01); C02F 1/24 (2013.01); *B01D 19/0036* (2013.01); *B01D 19/0427* (2013.01); *B01D 19/0431* (2013.01); *B01D 19/0459* (2013.01); *C02F 2101/322* (2013.01)

(58) Field of Classification Search
None
See application file for complete search history.

(56) References Cited

U.S. PATENT DOCUMENTS

| | | |
|---|---|---|
| 4,279,743 A | 7/1981 | Miller |
| 4,397,741 A | 8/1983 | Miller |
| 4,399,027 A | 8/1983 | Miller |
| 4,997,549 A | 3/1991 | Atwood |
| 5,122,165 A * | 6/1992 | Wang et al. ................... 95/92 |
| 5,405,497 A * | 4/1995 | Torregrossa .................. 162/38 |
| 5,529,701 A * | 6/1996 | Grisham et al. ............. 210/787 |
| 5,531,904 A | 7/1996 | Grisham et al. |
| 5,858,237 A | 1/1999 | Hashmi |
| 6,602,327 B2 | 8/2003 | Morse et al. |
| 6,949,195 B2 | 9/2005 | Morse et al. |
| 7,934,606 B2 | 5/2011 | Greene et al. |
| 8,281,932 B2 | 10/2012 | Schneider et al. |
| 8,286,805 B2 | 10/2012 | Hopper |
| 8,313,565 B2 | 11/2012 | Sarshar et al. |
| 8,475,664 B2 | 7/2013 | Keyser et al. |
| 8,529,772 B2 | 9/2013 | Hopper |
| 2005/0172808 A1* | 8/2005 | Yi .................................. 95/245 |
| 2012/0118818 A1 | 5/2012 | Moraes et al. |
| 2013/0146535 A1 | 6/2013 | Albert |

FOREIGN PATENT DOCUMENTS

| | | |
|---|---|---|
| CN | 1045763 C | 8/1994 |
| CN | 2348097 Y | 3/1998 |
| CN | 1358552 A | 12/2001 |
| CN | 1546190 A | 12/2003 |
| CN | 200845382 Y | 7/2006 |
| CN | 200981025 Y | 10/2006 |
| CN | 10135269 A | 7/2007 |
| CN | 101793138 A | 3/2010 |
| UA | 74981 C2 | 9/2004 |
| WO | 88/09696 A1 | 6/1987 |

* cited by examiner

*Primary Examiner* — Thomas M Lithgow

(57) ABSTRACT

A specialized gas sparged hydrocyclone apparatus in conjunction with the present invention can remove volatile organic compounds from ground water and other large water bodies. The volatile organic compounds recovered with the invention are in a concentrated form, which facilitates the disposal of these compounds as a hazardous waste.

10 Claims, 2 Drawing Sheets

METHOD OF STRIPPING VOLATILE ORGANIC COMPOUNDS FROM WATER USING A GAS SPARGED HYDROCYCLONE

CROSS REFERENCE TO RELATED APPLICATIONS

This application claims priority to provisional application Ser. No. 61/902,261, filed Nov. 10, 2013 which is incorporated herein by reference in its entirety.

The present invention relates to the removal of volatile organic compounds from water. Removal of these materials from water involves the use of a specialized gas sparged hydrocyclone apparatus.

BACKGROUND OF THE INVENTION

Air sparged hydrocyclone apparatuses have been used in various applications for cleaning or otherwise separating one material from another. Examples include flotation methods for cleaning of coal, processing tar sands, and for separating minerals from their host material. For example, U.S. Pat. Nos. 4,279,743; 4,397,741; and 4,399,027, each issued to Miller, disclose an air sparged hydrocyclone apparatus used for separating solids, such as minerals, from water. Shumeng, et al. disclose a hydrocyclone unit in published Chinese patent application No. 200620148747.2 (Patent ID: CN 200981025 Y). According to Shumeng, et al., the hydrocyclone units is used for separating oil from water. The apparatus of Shumeng, et al. does not utilize negative pressure in the system. Kalnins discloses a hydrocyclone unit in Published PCT application No. WO 88/09696. The hydrocyclone unit utilizes a pressure-reducing device in the form of a venturi positioned at the end of a fluid inlet where inflowing contaminated liquid is introduced to the lower end of the hydrocyclone unit. The negative pressure created by the venturi increases the rate of flow of the inflowing contaminated liquid. Kalnins does not use negative pressure to separate compounds such as volatile organic compounds from liquids, such as water. Accordingly, none of these references disclose methods of removing volatile organic compounds and related products from water according to the present invention.

SUMMARY OF THE INVENTION

The present invention relates to a method of removing volatile organic compounds and related products from water, often in substantial amounts. The method of the invention utilizes a specialized gas sparged hydrocyclone apparatus to eliminate or substantially reduce volatile organic compounds (VOCs) from water. The specialized air sparged hydrocyclone apparatus employs a mass transfer method that enhances the volatilization of VOC from water in the liquid state into a vapor phase. This technology removes VOCs from the water in the liquid state as well as other liquid components, such as petroleum products. Volatile organic compounds, which inherently have relatively high vapor pressures, can be readily disengaged from admixtures with liquids in the present invention. Use of this technology is particularly suited for removal of VOCs, particularly in low concentrations, from liquid water.

The present invention utilizes a specialized gas sparged hydrocyclone apparatus for mixing a stripping gas, such as air, oxygen, carbon dioxide, nitrogen, argon, helium, or other appropriate gas with VOCs dissolved, or otherwise present, in liquid water. The specialized apparatus comprises a hydrocyclone top, or head portion, secured to a rigid container located below the hydrocyclone top. A sparger is positioned and retained inside the rigid container. The sparger is a porous substantially cylindrical element. In preferred embodiments, the sparger is made of sintered stainless steel. An appropriate stripping gas is fed under pressure to the rigid container through a conduit. The rigid container has one or more inlets traversing the rigid container and in fluid communication with a plenum positioned between the rigid container and the sparger. Once in the plenum, the stripping gas flows from the plenum through the pores of the sparger and into a hollow interior area in the center of the sparger. A source of negative pressure or partial vacuum is in fluid communication with the interior area of the sparger.

In the process, liquid water contaminated with VOCs is fed into the hydrocyclone top from a conduit. The VOC-contaminated water moves downwardly from the hydrocyclone top into the interior area of the sparger in a spiraling or swirling fashion to form a vortex. When the stripping gas passes through pores in the sparger and exits the sparger in the presence of VOC-contaminated water, the stripping gas forms numerous bubbles. As the bubbles encounter and mix or react with the vortex of VOC-contaminated water in the interior area of the sparger, a froth or foam is formed. The VOCs are captured and separated from most or all of the VOC-contaminated liquid water by the froth or foam. Under the influence of negative pressure or partial vacuum present in the apparatus, a portion of the froth or foam collapses and transforms into a stream of liquid water substantially free of VOCs. Collapse of the froth or foam occurs above the bottom of the sparger. The stream of liquid water, stripped or otherwise substantially removed of VOCs, continues to flow downwardly through an unrestricted opening in a bottom, or lower, portion the sparger into a first reservoir or storage vessel located beneath the hydrocyclone apparatus. Also with the aid of negative pressure or partial vacuum present in the apparatus, VOC-containing froth or foam flows upwardly in the interior area of the sparger. The VOC-containing froth or foam then flows out of the interior area of the sparger through the hydrocyclone top and into a conduit. The VOC-containing froth or foam moves through the conduit and into a separate second reservoir, "overflow drum," or "surge vessel." Once in the second reservoir, the froth or foam separates into a liquid phase and a gaseous phase. The liquid phase is primarily water. Contaminants such as hydrocarbons can also be present in the liquid water. The previously VOC-containing liquid water component of the froth or foam drops to a bottom portion of the second reservoir. The liquid water and any dissolved contaminates residing in the bottom of the second reservoir flow out of an opening or conduit in the bottom of the second reservoir for appropriate handling. The gaseous phase contains primarily liberated VOCs. Other volatile compounds can also be present in the gaseous phase. The gaseous VOCs rise to an upper region of the second reservoir separate from the liquid phase. The VOCs then flow out of the upper region of the second reservoir through an opening or conduit where the VOCs are recovered for appropriate disposal or use.

Accordingly, one embodiment of the present invention relates to a method of stripping volatile organic compound contaminates from water comprising the steps of providing a hydrocyclone unit including a hydrocyclone top, a rigid container disposed beneath the hydrocyclone top, a sparger in the rigid container, a plenum between said rigid container and said sparger, a first reservoir beneath said sparger, wherein said sparger has an open end in unrestricted fluid communication with said first reservoir, providing a flow of water contaminated with volatile organic compounds to said hydrocyclone top and downwardly into said sparger, providing a flow of stripping gas to said plenum and into said sparger, mixing said stripping gas with the water contaminated with volatile organic compounds in said sparger to provide a volatile organic compound—containing froth and water stripped of volatile organic compounds, capturing said volatile organic compound—containing froth from said hydrocyclone unit, separating stripping gas from said volatile organic compound-containing froth, disposing said stripping gas, and capturing said water stripped of volatile organic compounds from said sparger.

As used herein volatile organic compounds are in the form of sulfur-containing organic compounds; vinyl chloride; carbon tetrachloride; perchloroethylene; trichloroethylene; benzene; ammonia; phencyclidine; 1,1,1-trichloroethane; 1,1-dichloroethane; tetrachloroethylene; 1,1-dichloroethylene; acetone; cholobenzene; chloroethane; chloroform; chloromethane; cis-1,2-dichloroethene; cis-1,3-dichloropropene; dibromochloromethane; ethylbenzene; M,P,O-zylene; toluene; trans-1,2-dichloroethene; and trans-1,3-dichlopropene.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
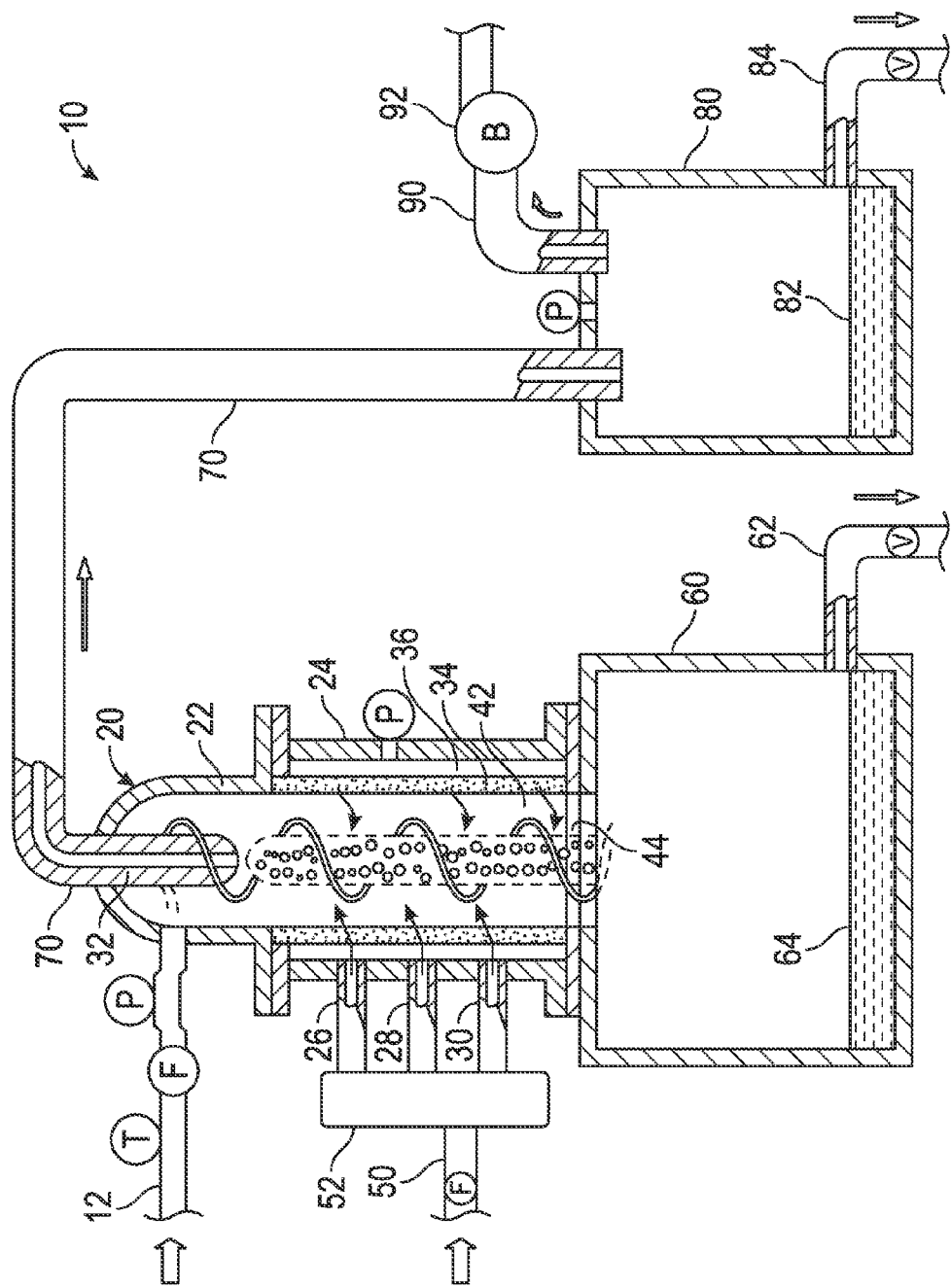
FIG. 1 illustrates a schematic block diagram, with elements in partial section, of an air sparged hydrocyclone system suitable for use in the present invention.

FIG. 1 is a schematic block diagram of apparatus 10, portions of which are in partial section, illustrating the method of the present invention in stripping, reacting, or otherwise removing VOC's from liquids. Liquid water contaminated with VOCs flows in a feed conduit 12 to a specialized gas sparged hydrocyclone unit 20. The liquid flow rate in the conduit 12 may vary from about fifteen (15) gallons per minute to about thirty (30) gallons per minute. A liquid flow of about fifteen (15) gallons per minute (gpm) is preferred.

Appropriate sensors, such as temperature, pressure, and flow rate, and valves, indicated respectively by T, P, F, and V, are associated with the various elements of the apparatus 10. Other appropriate valves and related equipment, not shown, is also associated with the conduit 12. Sensors and other control devices may be added as desired.

The unit 20 includes a hydrocyclone top 22 disposed at the top of a rigid container 24. The rigid container 24 can have many forms including, but not limited to, straight and/or curved tubes of various cross-sections, spheres, cubes, rectangular boxes, cylinders, ovoids, and combinations thereof. The rigid container can be made of a variety of materials including, but not limited to, metals, ceramics, polymers, composites, and combinations thereof. A preferred material for the rigid container 24 is steel. The conduit 12 is connected to the hydrocyclone top 22. Within the rigid container 24 is a sparger 34. The rigid container 24 and the sparger 34 are secured to a first reservoir, "underflow drum," or "residual disengagement vessel" 60 positioned beneath, or under, the rigid container 24 and sparger 34 combination.

As illustrated in FIG. 1, the sparger 34 is located within the rigid container 24. The inner diameter of the rigid container 24 is greater than the outer diameter of the sparger 34. Between the sparger 34 and the rigid container 22 is a plenum 36. Gas inflowing from a conduit 50 and manifold 52 flows into the plenum 36 under pressure through at least one input conduit, runner, or inlet. Preferably, a plurality of input conduits, runners, or inlets is used. Three such input conduits, runners, or inlets 26, 28 and 30 are illustrated in FIG. 1. Gas flow to the rigid container 24 from the manifold 52 may vary in accordance with the flow rate of the VOC-contaminated water in the feed conduit 12. The gas flow rate is measured in standard cubic feet per minute (scfm). Gas flow to the rigid container 24 from the manifold 52 may vary from about five (5) scfm to about fifteen (15) scfm. The reacting or stripping gas in the conduit 50 may be air, oxygen, carbon dioxide, nitrogen, argon, helium, or other appropriate gas. The sparger 34 is porous to the flow of a desired stripping gas. The positive pressure in the plenum insures the inwardly flowing stripping gas moves through the pores in the sparger 34 relatively uniformly along the length of the sparger. Uniform movement of stripping gas through the sparger 34 evenly mixes the stripping gas with a downward spiraling flow of VOC-contaminated water. In preferred embodiments, the sparger 34 is porous through the entire sintered tube. Initially, stripping gas from the conduit 50 flows through one or more inlets of the rigid container 24 and into the plenum 36. The stripping gas is at a pressure sufficient to cause the stripping gas to flow through the pores of the sparger 34. As the stripping gas flows from the plenum 36 through the pores in the sparger 34, the gas enters a chamber 42 in an interior area of the sparger.

The hydrocyclone top 22 induces a swirling or spiraling motion in the downwardly flowing VOC-contaminated water to form a vortex. As the stripping gas enters the interior area of the sparger in the presence of VOC-contaminated water, numerous gas bubbles are formed. The gas bubbles mix with the VOC-contaminated water flowing downwardly in a vortex from the hydrocyclone top 22 in the interior area of the sparger 34 to form a froth or foam therein. The froth, or foam, contains a mixture of liquid water and VOC-contaminating products. With the application of negative pressure or partial vacuum, the VOC-containing portion of the froth flows upwardly in the sparger, out of the hydrocyclone top 22, through a vortex finder or upper nozzle 32 in the hydrocyclone top 22 and into a conduit 70. The vortex finder or upper nozzle 32 is appropriately secured and sealed to the hydrocyclone top 22 and the conduit 70.

The upwardly flowing foamy or frothy mixture of VOC-contaminating products and residual water flows through the conduit 70 to a second reservoir, overflow vessel, separator, surge vessel, or drum 80. As the VOC-containing froth or foam enters the second reservoir, the froth or foam collapses or otherwise disintegrates under the influence of negative pressure or partial vacuum present in the second reservoir.

As the froth or foam collapses or disintegrates in the second reservoir, residual liquid water and any dissolved, suspended, admixed, or emulsified materials separate from the foam, or froth, and move to a bottom portion of the second reservoir, overflow vessel, separator, surge vessel, or drum 80. The water cleansed or purified of VOC-contaminants flows outwardly from the second reservoir, overflow vessel, separator, surge vessel, or drum 80 through a regulated conduit 84 for appropriate disposition. Large arrows by the respective conduits in FIG. 1 show the direction of flow of the various materials.

In addition to residual liquid water and any dissolved, suspended, admixed, or emulsified materials separating from the froth or foam as the froth of foam collapses or disintegrates in the second reservoir, the VOCs separate from the froth or foam in a gaseous form. The VOCs occupy an upper portion of the second reservoir apart from the substantially VOC-free liquid water residing in the bottom of the second reservoir. The gaseous VOCs exit the upper portion of the second reservoir through an opening or conduit 90 where the VOCs are recovered for appropriate disposal or use.

A vacuum pump or blower 92 in the conduit 90 causes a negative pressure or partial vacuum to be generated in the second reservoir, overflow vessel, separator, surge vessel, or drum 80. The negative pressure or partial vacuum extends into conduit 70 through the hydrocyclone head 22 and into the interior of the sparger 34. The negative pressure or partial vacuum in the system pulls the frothy, or foamy, mixture out of the hydrocyclone unit 20 through the upper nozzle or vortex finder 32, into the conduit 70, and on to the second reservoir, overflow vessel, separator, surge vessel, or drum 80. The negative pressure or partial vacuum in the second reservoir, overflow vessel, separator, surge vessel, or drum 80 also helps to disengage remaining gaseous products from the water residing in the second reservoir, overflow vessel, separator, surge vessel, or drum 80.

The downwardly flowing water, minus the contaminating VOC products which have been captured in the upwardly flowing froth or foam within the sparger 34, goes into a first reservoir, "underflow drum," or "residual disengagement vessel" 60 through an unrestricted opening in the bottom, or lower, end 44 of the sparger 34. VOC-free water flows out through a conduit 62 in the first reservoir, "underflow drum," or "residual disengagement vessel" 60 and returns to a storage tank (not shown). Flow from the first reservoir, "underflow drum," or "residual disengagement vessel" 60 and into the conduit 62 is appropriately regulated to keep the water level at an appropriate height in the reservoir. The water level in the first reservoir, underflow drum, or residual disengagement vessel 60 is indicated by reference numeral 64.

The flow of the froth, or foam, from the chamber within the sparger 34 is dynamically moved due to the differential pressure between the first reservoir, "underflow drum," or "residual disengagement vessel" 60 and the second reservoir, overflow vessel, separator, surge vessel, or drum 80.

The apparatus 10, including the hydrocyclone unit 20, with its hydrocyclone top 22, the rigid container 24, and the upper nozzle or vortex finder 32, the first reservoir, "underflow drum," or "residual disengagement vessel" 60, second reservoir, overflow vessel, separator, surge vessel, or drum 80, and the various conduits, comprise a sealed system. The negative pressure or partial vacuum in the system from the blower 92 is about six (6) inches of mercury (Hg).

The generally spiraling downward liquid flow in the sparger 34 is schematically illustrated in FIG. 1 by arrows and the generally upwardly flow of the foam or froth is also schematically illustrated in FIG. 1 by arrows. Similarly, the flow of the stripping gas through the pores in the sparger is schematically illustrated in FIG. 1 by small arrows.

Figure 2:
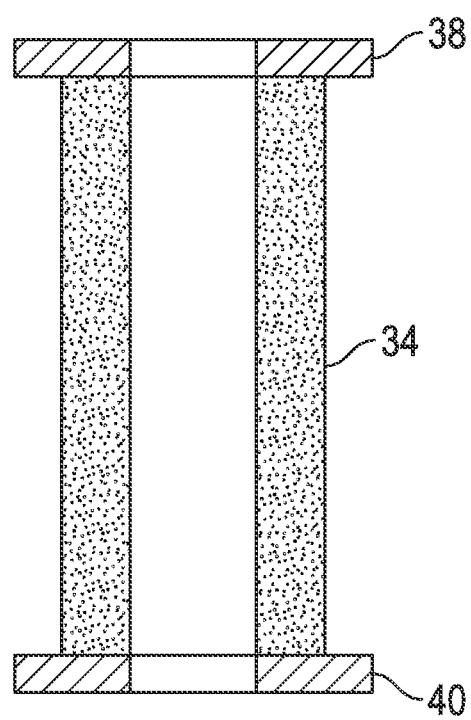
FIG. 2 illustrates a cross-sectional view of an air sparger suitable for use in the present invention.

FIG. 2 is an enlarged view in partial section through the sparger 34 of FIG. 1. For the following discussion, reference will primarily be made to FIG. 2, but reference will also be made to FIG. 1.

The sparger 34 comprises a tube or pipe made of one or more porous materials. Suitable materials for the sparger 34 include, but are not limited to, sintered metallic particles, porous high density polyethylene, porous foil mesh, porous ceramic membrane made from aluminum oxide and/or silicon carbonate membrane. Preferred sintered metallic particles are stainless steel. The pores in the sintered tube are of such a size as permit the flow of a gas through the tube or pipe and into the interior of the sparger element, but not permit liquids to pass therethrough when gas is flowing through the sparger. Preferred pore sizes vary from about five microns (5 µm) to about eighty microns (80 µm).

Referring to FIG. 2, the sparger 34 also includes a pair of plates, a top plate 38 and a bottom plate 40. The plates 38 and 40 are outwardly extending flanges which provide the elements for sealing and securing the sparger to the hydrocyclone head 22, the rigid container 24, and the first reservoir, "underflow drum," or "residual disengagement vessel" 60.

Appropriate securing and sealing elements, such as bolts, o-rings, welds, and the like have been omitted from the drawing figures. It is understood the various elements, including the various conduits and sensors, are appropriately secured and sealed in the apparatus and system.

The sparger element has been described in conjunction with the stripping of contaminating products from water, it will be understood that such sparger may also be used in other applications. Another application is for the removal of contaminates from water such as petroleum products.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of stripping volatile organic compound contaminates from water comprising the steps of:
   providing a hydrocyclone unit including:
      a hydrocyclone top;
      a rigid container disposed beneath said hydrocyclone top;
      a sparger in said rigid container;
      a plenum between said rigid container and said sparger;
      a first reservoir beneath said sparger;
      wherein said sparger has an open end in unrestricted fluid communication with said first reservoir;
      a conduit having one end in fluid communication with an upper outlet of said hydrocyclone top and an opposite end in fluid communication with a second reservoir;
   providing a flow of water contaminated with volatile organic compound to said hydrocyclone top and downwardly into said sparger;
   providing a flow of stripping gas to said plenum and into said sparger;
   mixing said stripping gas with the water contaminated with volatile organic compounds in said sparger to provide a volatile organic compound—containing froth and water stripped of volatile organic compounds;
   capturing said volatile organic compound—containing froth from said hydrocyclone unit;
   separating stripping gas from said volatile organic compound—containing froth;
   disposing said stripping gas; and
   capturing said water stripped of volatile organic compounds from said sparger.

2. The method of claim 1 wherein the sparger is a porous sintered stainless steel tube having pores of sufficient size to permit the stripping gas to flow through the sintered stainless steel tube and into the sparger while substantially preventing fluids from flowing into the pores.

3. The method of claim 1 further comprising a vortex finder in the hydrocyclone top.

4. The method of claim 1 wherein the stripping gas is air.

5. The method of claim 1 wherein the stripping gas is carbon dioxide.

6. The method of claim 1 wherein the stripping gas is pressurized.

7. The method of claim 1 further comprising the step of providing negative pressure to the second reservoir.

8. The method of claim 1 further comprising the step of providing a partial vacuum to the second reservoir.

9. The method of claim 1 wherein said volatile organic compounds include sulfur-containing compositions.

10. The method of claim 1 wherein said volatile organic compounds are selected from the group consisting of vinyl chloride; carbon tetrachloride; perchloroethylene; trichloroethylene; benzene; ammonia; phencyclidine; 1,1,1-trichloroethane; 1,1-dichloroethane; tetrachloroethylene; 1,1-dichloroethylene; acetone; cholobenzene; chloroethane; chloroform; chloromethane; cis-1,2-dichloroethene; cis-1,3-dichloropropene; dibromochloromethane; ethylbenzene; M,P,O-zylene; toluene; trans-1,2-dichloroethene; and trans-1,3-dichlopropene.

* * * * *